US006116258A

United States Patent [19]

Shapiro et al.

[11] Patent Number: 6,116,258

[45] **Date of Patent: *Sep. 12, 2000**

[54] METHOD AND APPARATUS FOR AN ELECTROHYDRAULIC CONTROL SYSTEM OF A STEAM TURBINE

[75] Inventors: Vadim Shapiro; Dmitry Drob, both of West Des Moines, Iowa; Mykhailo Volynskyi, Moscow, Russian Federation; Boris Zilberman, West Des Moines, Iowa

[73] Assignee: Compressor Controls Corporation, Des Moines, Iowa

[ * ] Notice: This patent issued on a continued prosecution application filed under 37 CFR 1.53(d), and is subject to the twenty year patent term provisions of 35 U.S.C. 154(a)(2).

[21] Appl. No.: 09/250,518

[22] Filed: Feb. 16, 1999

[51] Int. Cl.[7] .................... F16K 31/00

[52] U.S. Cl. .................... 137/1; 137/625.66; 251/29

[58] Field of Search .................... 137/625.66, 1; 251/29

[56] References Cited

U.S. PATENT DOCUMENTS

| | | | |
|---|---|---|---|
| 2,668,556 | 2/1954 | Meyer | 251/29 |
| 3,219,060 | 11/1965 | Pearl et al. | 137/625.66 X |
| 3,367,369 | 2/1968 | Wagner | 137/625.66 |

*Primary Examiner*—Gerald A. Michalsky
*Attorney, Agent, or Firm*—Henderson & Sturm LLP

[57] ABSTRACT

Pilot valves used in electrohydraulic control systems are driven by either an electromagnetic electromechanical actuator or an electromotor electromechanical actuator. A drawback of electromagnetic actuation is that on brief interruptions of electrical power the actuator causes a trip response to the pilot valve, whereas a drawback of electromotor actuation is that on complete interruptions of electrical power the actuator cannot independently cause a trip response of the pilot valve on demand. The proposed modification, involving the pilot valve, provides a means to effect a trip response regardless of the electromechanical actuator type used, together with overcoming the drawback of electromotor actuation. To realize the trip response, an additional piston (connected to the electromotor actuator's stem) is positioned between the actuator stem and the pilot valve. A surface area of the additional piston and one surface area of the pilot valve are loaded by pressure from an oil trip line in the hydraulic system. The loaded surface area of the pilot valve causes a force in the direction opposite to that of a trip, while the force on the additional piston is in the direction required for a trip. When a trip is required, hydraulic pressure in the trip line is reduced causing (1) the force on the actuator stem to go to zero; and (2) the other force, intrinsically found on the pilot valve, to actuate the pilot valve into a trip condition. The decrease of trip line pressure is carried out by three solenoid drain valves (each equipped with two solenoid coils) manipulated by three electronic overspeed trip devices operated by a two-out-of-three voting scheme. Consequently, this invention not only negates the disadvantage of using electromotor actuators, but it also provides overspeed protection and an under-load test of various control system elements.

23 Claims, 2 Drawing Sheets

METHOD AND APPARATUS FOR AN ELECTROHYDRAULIC CONTROL SYSTEM OF A STEAM TURBINE

TECHNICAL FIELD

This invention relates generally to an apparatus for increasing the operational capability of a steam turbine's electrohydraulic control system with respect to turbine shutdown. More specifically, the invention employs electromotor electromechanical actuators and supplementary equipment to achieve a more precise and responsible control-valve modulation than with the commonly used electromagnetic electromechanical actuators. Furthermore, when an electromotor actuator is coupled to an additional piston and working in conjunction with a pilot valve, the combined effect is capable of providing a mechanical trip to shut down the turbine on demand during complete electrical service interruptions independent of the motion of the actuator.

BACKGROUND ART

Present-day electrohydraulic steam-turbine control systems are generally equipped with electromagnetic electromechanical actuators that drive the pilot valves of hydraulic control-valve actuators. However, electromagnetic actuators have certain inherent disadvantages.

Their moving force usually depends on control signal values (amplitude).

They cannot function in the absence of control signals.

They trigger unintentional control-valve closures at a momentary dip in voltage.

Electromotor electromechanical actuators, on the other hand, are seldom used in the control systems for steam turbines, but they are totally capable of providing a full moving force independent of control signal values; in addition, they remain in their last position prior to either a momentary or a total loss of electrical power. Unfortunately, a drawback of electromotor actuators is that by themselves they cannot effect a trip action to shut down the turbine on demand during a complete electrical service interruption, unlike electromagnetic actuators that are, by nature, fail-safe.

DISCLOSURE OF THE INVENTION

A purpose of this invention is to improve upon the prior art by using an apparatus for increasing the operational capability of a steam turbine's electrohydraulic control system with respect to trip action in shutting down the turbine during a complete electrical service interruption.

The improvement consists of replacing the commonly used electromagnetic electromechanical actuators with electromotor electromechanical actuators that fully compensate for the disadvantages of the electromagnetic units. But electromotor actuators also exhibit a disadvantage, such that when subjected to an electrical power outage, they cannot independently provide a trip to shut down the turbine on demand. Nevertheless, this drawback can be overcome by the installation of an additional piston which can effect a trip independently of the actuator's motion.

This additional piston, which functions in a subsidiary capacity, is connected to the electromotor actuator's stem and positioned between the stem and a control-valve actuator's pilot valve. The piston's surface area is loaded by oil pressure from a trip line that also loads a first surface area of the pilot valve to create a first force; furthermore, the pilot valve's second surface area is loaded by oil pressure from an after-pump line to create a second force opposing the first force, resulting in a differential force that forces the pilot valve toward the additional piston, which assures simultaneous movement between the actuator and the pilot valve. When a trip is initiated, a decrease in trip line pressure results in the pilot valve's first force becoming equal to zero, while the second force moves the pilot valve away from the additional piston (independent of the electromotor actuator's position or motion) to provide a trip response, thereby closing the control valve. A block valve can be similarly modulated. Under normal operating conditions, the net force (including the pilot valve's first and second forces, and the force acting on the additional piston) is equal to zero and unloads the electromotor actuator of oil pressure forces.

All actuators (not less than two, including control valve and block valve actuators) of the control system's hydraulic portion are connected to the oil trip line whose pressure is regulated by three electromagnetic (solenoid) drain valves governed by a two-out-of-three voting scheme. This activity results in creating turbine shutdown availability on demand during a period of power loss or overspeed conditions.

BEST MODE FOR CARRYING OUT THE INVENTION

Figure 1:
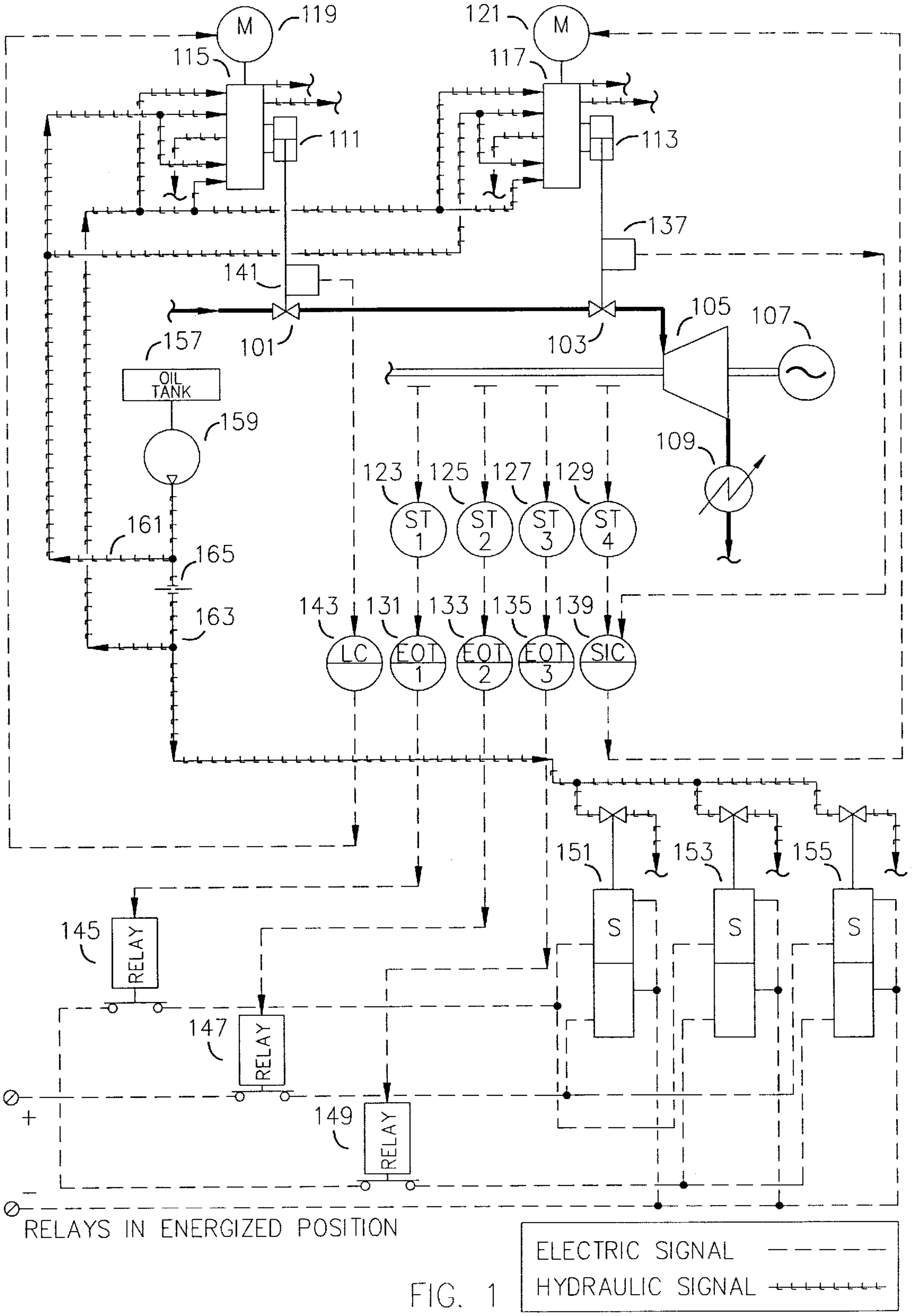
FIG. 1 shows a steam turbine control system with elements of a two-out-of-three voting scheme.

FIG. 1 shows a steam turbine control system in which fresh steam flows through a block valve 101 and a control valve 103, then through a turbine 105 (driving an electrical generator 107), and continues on to a condenser 109. The block valve 101 and the control valve 103 are modulated by a first and a second hydraulic actuator 111, 113 in conjunction with their respective pilot-valve assemblies 115, 117 that, in turn, are driven by a first and a second electromotor electromechanical actuator 119, 121.

The turbine is equipped with four Rotational Speed Transmitters, (ST 1–4) 123, 125, 127, 129. Transmitters ST 1–3 input to three Electronic Overspeed Trip devices (EOT 1–3) 131, 133, 135; whereas, ST 4 129 and a control-valve position transmitter 137 both input to a Speed Indicating Controller (SIC) 139 connected directly to the second electromotor actuator 121. Likewise, a block-valve position transmitter 141 inputs to a Logic Controller (LC) 143 connected to the first electromotor actuator 119.

EOT 1–3 input to three relays (two-out-of-three voting elements) 145, 147, 149 that, when energized, activate three solenoid drain valves 151, 153, 155, each equipped with a two-coil set connected to a power source. Throughout turbine operation, all solenoid coils are under voltage, but only one coil of a two-coil set is needed to hold its companion valve closed.

The turbine is also equipped with an oil tank 157 and pump 159 that supplies the two pilot-valve assemblies 115, 117 through an after-pump line 161, as well as through a trip line 163 by way of an orifice 165.

Figure 2:
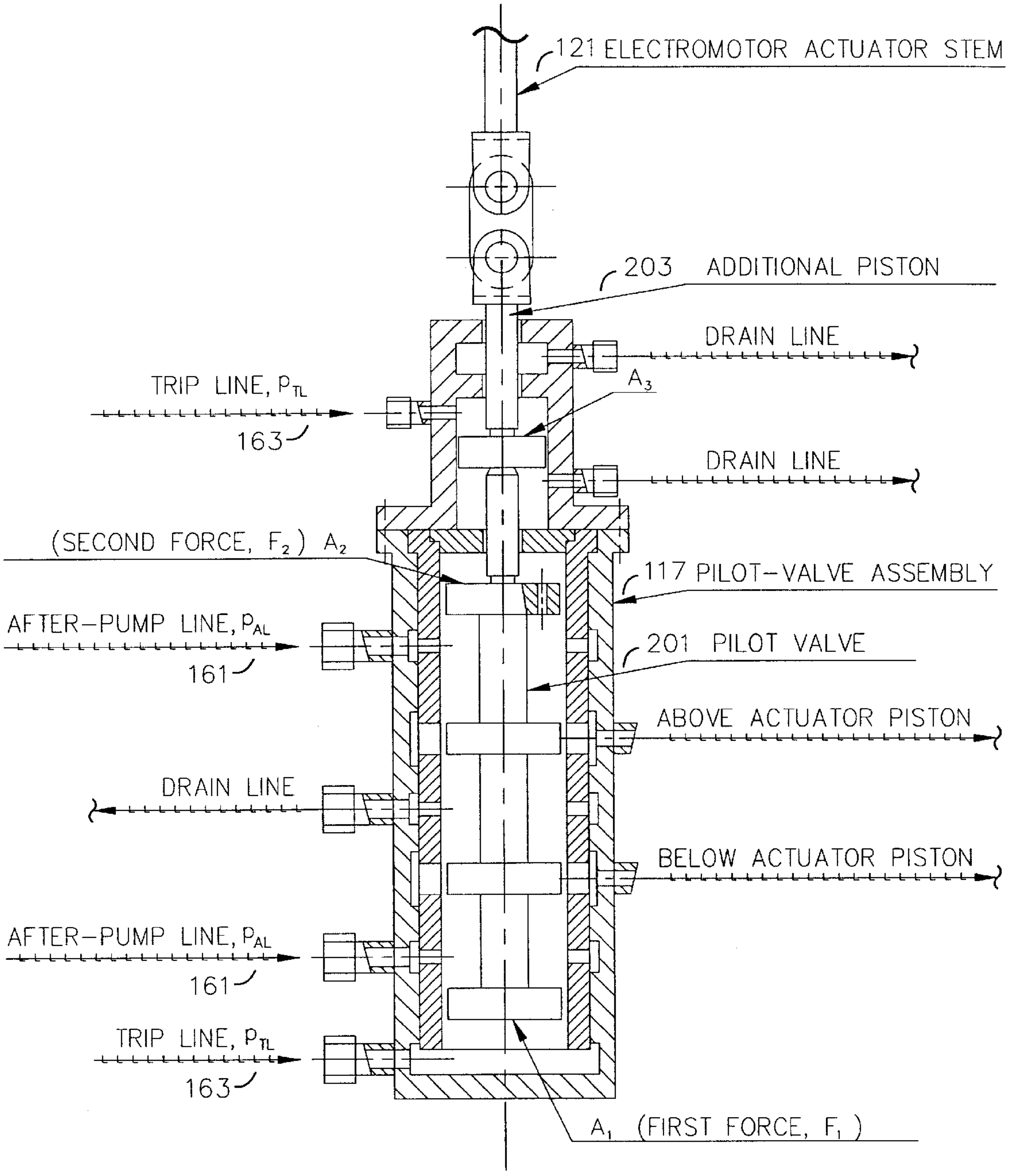
FIG. 2 shows a cutaway view of a pilot-valve assembly comprising an additional piston and a pilot valve.

FIG. 2 shows a cutaway view of the second pilot-valve assembly 117 that manipulates the second hydraulic actuator 113 (see FIG. 1). In this setup, a pilot valve 201 regulates two oil flows: (1) above the piston of the control-valve actuator 113, and (2) below the actuator's piston.

A surface area, $A_1$, at the pilot valve's underside is loaded by trip line 163 oil pressure ($p_{TL}$); and a second surface area, $A_2$, (topside of pilot valve) is loaded by after-pump line 161 oil pressure ($p_{AL}$). This loading of the pilot valve, by applied pressure, results in a differential force [$\Delta F=(p_{TL}\ A_1)-(p_{AL}\ A_2)=F_1-F_2$] that advances the pilot valve 201 and presses it against an additional piston 203 connected to the stem of the second electromotor actuator 121. The additional piston's surface area, $A_3$, is also loaded by applied pressure ($p_{TL}$) from the trip line 163 and while in this application, $F_2=p_{TL}\ A_3=\Delta F$; so that, in steady state the resultant of all forces is zero and there is no net force being applied to the electromotor actuator stem 121.

The first pilot-valve assembly 115, interacting with the first electromotor actuator 119 and its additional piston, is of the same design and functions in the same manner as the second pilot-valve assembly 117.

The following segment describes the overall operation of the proposed turbine control system while under load. In this operational setup, the Speed Indicating Controller (SIC) 139 initiates modulation of the control valve 103 by way of the second electromotor actuator 121 to maintain the turbine power required to support rotational speed as measured by the fourth Speed Transmitter (ST 4) 129. The control valve's 103 position is measured by its position transmitter 137.

At the time of start-up and of normal shutdown, the first hydraulic actuator 111 (governed by the Logic Controller 143) opens and closes the block valve 101 by way of the first electromotor actuator 119.

During operation, the SIC 139 commands the second electromotor actuator 121 that drives the additional piston 203 and the pilot valve 201. Therefore, when rotational speed increases, the electromotor actuator 121 moves the additional piston and the pilot valve downward to begin the closing sequence of the control valve 103; this sequence is reversed when rotational speed decreases. In steady state, the pilot valve seals off the oil ports (as shown is FIG. 2) that adjoin the control-valve actuator's 113 piston with the after-pump line 161 and with the adjacent drain line, thereby maintaining the control valve 103 in a required position.

Should the second electromotor actuator 121 fail, the pilot valve 201 and the piston of the control-valve actuator 113 will remain in their respective positions prior to the actuator's failure; and while in this state, the turbine will continue to produce power equal to that before the failure, at least for a short duration. But if a load 107 rejection also occurs during this interval of electromotor actuator failure, turbine speed will increase to the Electronic Overspeed Trip (EOT) set point. When this happens, EOT 1–3 131, 133, 135 perform their own separate processing of overspeed conditions.

Each EOT device controls an onboard trip relay that is de-energized when a trip condition occurs, sending discrete signals to the three relays 145, 147, 149 which are, in turn, de-energized (opened). Voltage is then cut to the solenoid coils 151, 153, 155, opening their corresponding drain valves, and decreasing pressure in the trip line 163. Subsequently, as trip line pressure ($p_{TL}$) decreases at pilot-valve area $A_1$, the pilot valve (loaded by after-pump pressure, $p_{AL}$, at $A_2$) moves downward and initiates closing of the control valve 103. Simultaneously, trip line pressure, $p_{TL}$, on area $A_3$ of the additional piston 203 decreases, unloading the electromotor actuator stem 121. At the same time, and by the same method, the first hydraulic actuator 111 closes the block valve 101, even if its electromotor actuator 119 is fully functional.

In this failure scenario, EOT 1–3 131, 133, 135 work together as a single unit to commence turbine shutdown, owing to overspeed conditions. Because of their voting capability, any two of the three EOTs can set in motion the opening of at least one solenoid drain valve; even so, both coils of any drain valve must be de-energized to complete the opening process. Additionally, if one EOT device fails, the turbine will not trip because the two-coil combination together with the output configurations of the three relays 145, 147, 149 ensure that the corresponding solenoid drain valve remains closed or can be opened on demand. The same safety features are applicable should one of the coils be defective or inoperative. Therefore, a control system of this type provides not only overspeed protection, but also an under-load test of Rotational Speed Transmitters (ST 1–3) 123, 125, 127; every Electronic Overspeed Trip device (EOT 1–3) 131, 133, 135; and every solenoid-valve coil 151, 153, 155.

The example used herein depicts the use of this invention for controlling both a steam turbine governing device and a block valve when a pilot valve is driven by an electromotor actuator; in addition, applied hydraulic pressures have been described. However, it should be noted that the type of electromechanical actuators is immaterial because the trip action is entirely isolated from the actuators. This invention has many applications wherever electromechanical actuators and pilot valves are used.

Obviously, many modifications and variations of the present invention are possible in light of the above teachings. It is, therefore, to be understood that within the scope of the appended claims, the invention may be practiced otherwise than as specifically described.

We claim:

1. An apparatus for providing a trip response to a pilot valve, the apparatus comprising:

(a) a piston connected to an actuator stem and pressing on the pilot valve;

(b) a surface area of the piston having an applied pressure;

(c) a first surface area of the pilot valve having an applied pressure and providing a force in an opposing direction to that of the pressure applied to the surface area of the piston; and (d) means for relieving the pressure applied to the first surface area of the pilot valve to cause the trip response.

2. The apparatus of claim 1, wherein the actuator to which the piston is connected is an electromechanical actuator.

3. The apparatus of claim 1, wherein the pilot valve has a second surface area having an applied pressure resulting in a force in the same direction as that of the pressure applied to the surface area of the piston.

4. The apparatus of claim 3, wherein the pressure applied to the second surface area of the plot valve is from a different source than the pressure applied to the first surface area of the pilot valve.

5. The apparatus of claim 3, wherein the resultant of all forces is zero in steady state, due to pressures applied to the surface areas.

6. The apparatus of claim 3, wherein relieving the pressures applied to the surface area of the piston and to the first surface area of the pilot valve results in the pilot valve being moved in the direction of the force attributed to pressure on the second surface area of the pilot valve.

7. The apparatus of claim 1, wherein relieving the pressures applied to the surface area of the piston and to the first surface area of the pilot valve results in zero force being applied to the actuator stem.

8. The apparatus of claim 1, also comprising a trip system, wherein the means for relieving the pressure applied to the first surface area of the pilot valve comprises:

a. not less than three solenoid drain valves;

b. said solenoid drain valves, each equipped with a two-coil set; and c. not less than three overspeed trip-device discrete outputs, each connected to two coils and each coil located on a different drain valve.

9. The apparatus as in claim 1, 4, or 8, wherein the pressure applied to the first surface area of the pilot valve is from the same source as the pressure applied to the surface area of the piston.

10. A method for providing a trip response to a pilot-valve assembly independent of an actuator's movement comprising the actuator, a differential-force element, and a pilot valve, wherein a first net force is applied to the pilot valve, the first net force tending to press the pilot valve toward the actuator, thereby assuring simultaneous movement between the actuator and the pilot valve until the trip response is initiated.

11. The method of claim 10, wherein a second net force is applied to the differential-force element, resulting in a negligible net force on the actuator in steady state.

12. The method of claim 11, wherein upon trip, the second net force is significantly reduced.

13. The method of claim 12, wherein significantly reducing the second net force results in a negligible force applied to the actuator.

14. The method of claim 11, wherein upon trip, a direction of the first net force is reversed such that the pilot valve is forced away from the actuator.

15. The method of claim 10 including using a piston as the said differential-force element.

16. An apparatus for providing a trip response to a pilot-valve assembly independent of an actuator's movement, the apparatus comprising the actuator, a differential-force element, a pilot valve, and means to apply a first net force to the pilot valve, the first net force tending to press the pilot valve toward the actuator, thereby assuring simultaneous movement between the actuator and the pilot valve until the trip response is initiated.

17. The apparatus of claim 16 including a means to apply a second net force to the differential-force element, resulting in a negligible net force on the actuator in steady state.

18. The apparatus of claim 17 including means to cause the second net force to be significantly reduced.

19. The apparatus of claim 18 including means to reverse a direction of the first net force such that the pilot valve is forced away from the actuator.

20. The apparatus of claim 19, also comprising a trip system, wherein the means for reversing the direction of the first net force comprises:

(a) not less than three solenoid drain valves, each equipped with a two-coil set; and (b) not less than three overspeed trip-device discrete outputs, each connected to two coils and each coil located on a different drain valve.

21. The apparatus of claim 18, wherein significantly reducing the second net force results in a negligible force applied to the actuator.

22. The apparatus of claim 16, wherein the actuator is an electromechanical actuator.

23. The apparatus of claim 16 wherein said differential-force element comprises a piston.

* * * * *